Aug. 8, 1944.  E. N. LOWRY  2,355,385
MACHINE FOR APPLYING CLOSURES TO BOTTLES
Filed Feb. 23, 1940  12 Sheets-Sheet 3

INVENTOR:
Edward N. Lowry,
BY Bodell & Thompson
ATTORNEY.

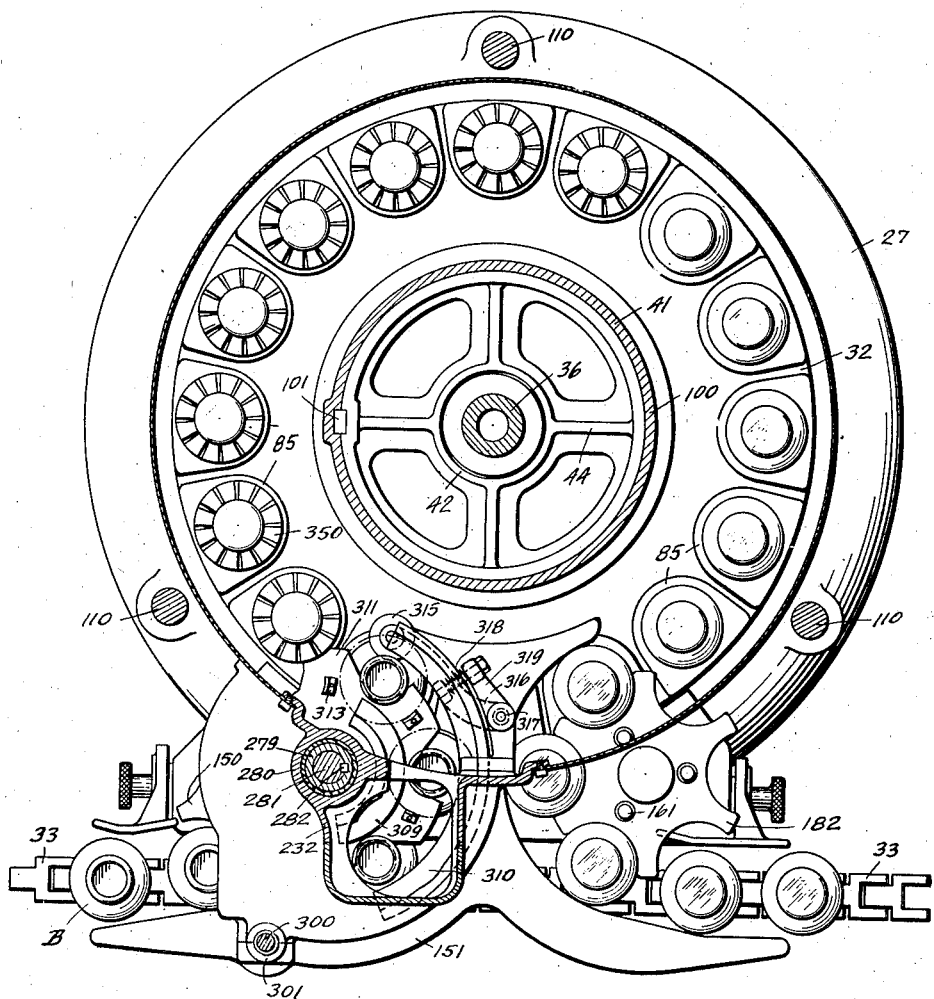

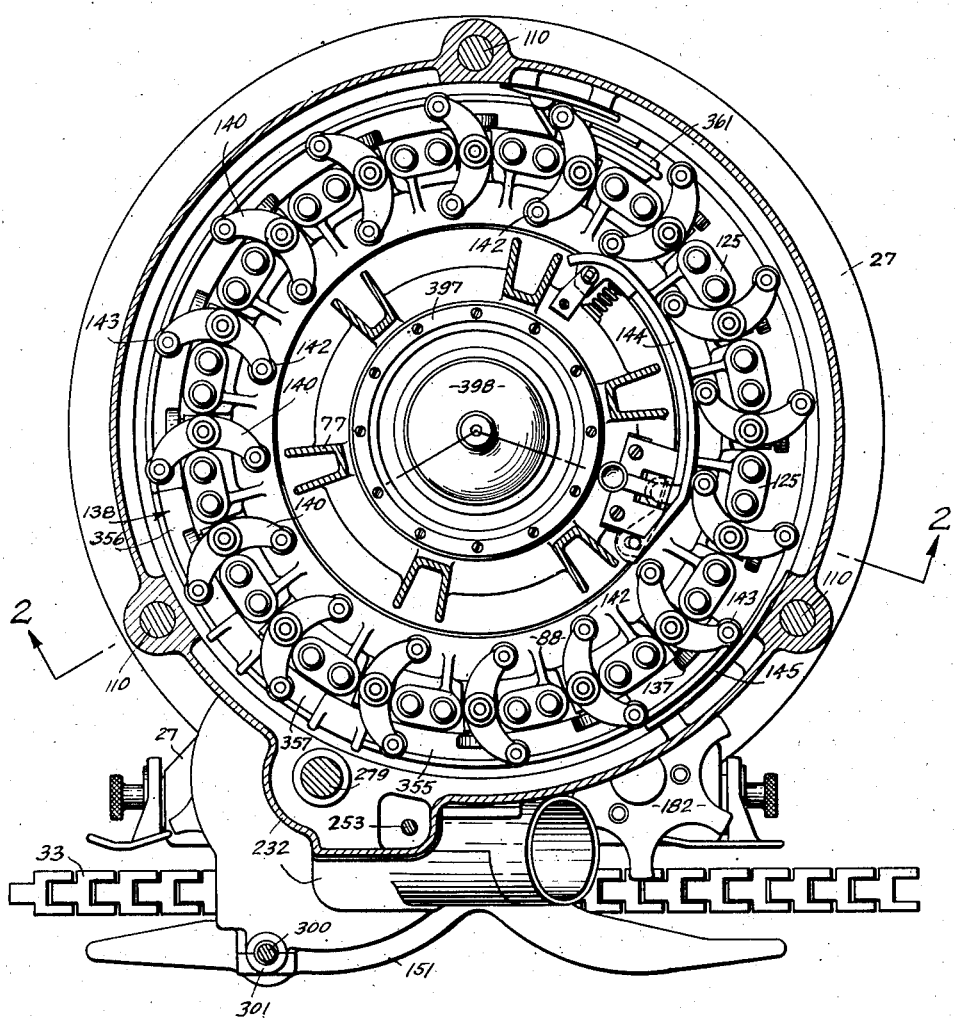

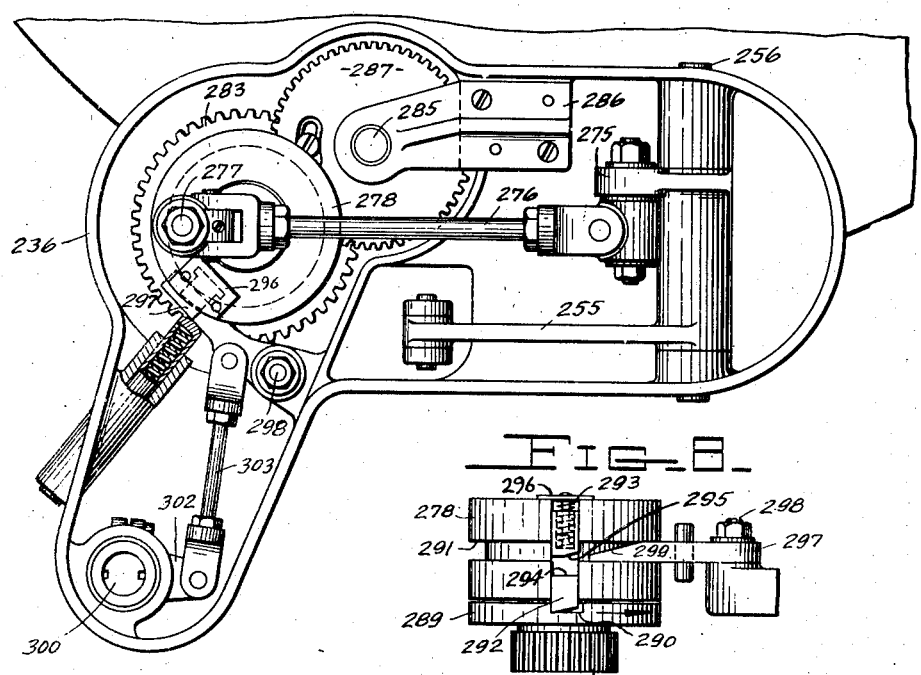
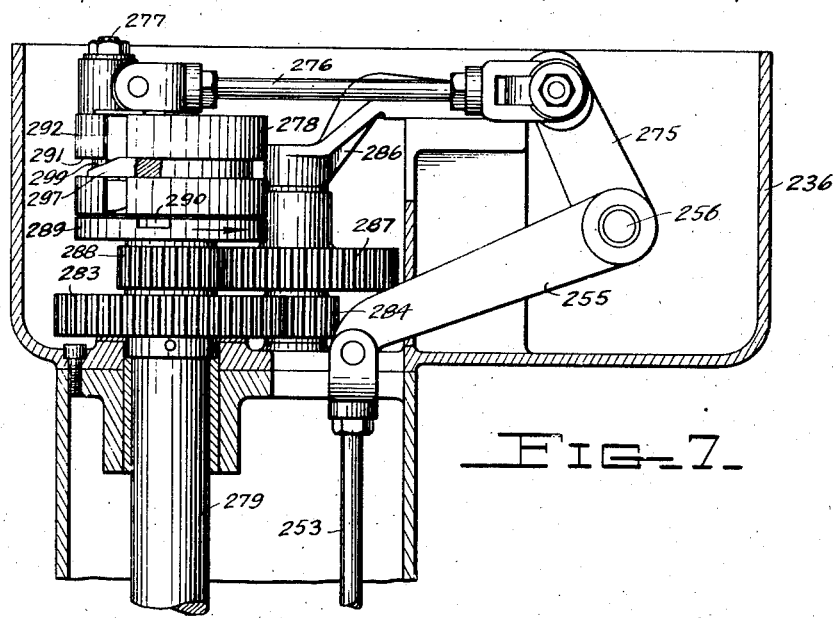

Aug. 8, 1944.　　　　E. N. LOWRY　　　　2,355,385
MACHINE FOR APPLYING CLOSURES TO BOTTLES
Filed Feb. 23, 1940　　　12 Sheets-Sheet 7

INVENTOR:
Edward N. Lowry,
BY Bodell & Thompson
ATTORNEYS.

Aug. 8, 1944.  E. N. LOWRY  2,355,385
MACHINE FOR APPLYING CLOSURES TO BOTTLES
Filed Feb. 23, 1940  12 Sheets-Sheet 8

INVENTOR:
Edward N. Lowry,
BY Bodell & Thompson
ATTORNEYS.

Aug. 8, 1944.  E. N. LOWRY  2,355,385
MACHINE FOR APPLYING CLOSURES TO BOTTLES
Filed Feb. 23, 1940  12 Sheets-Sheet 9
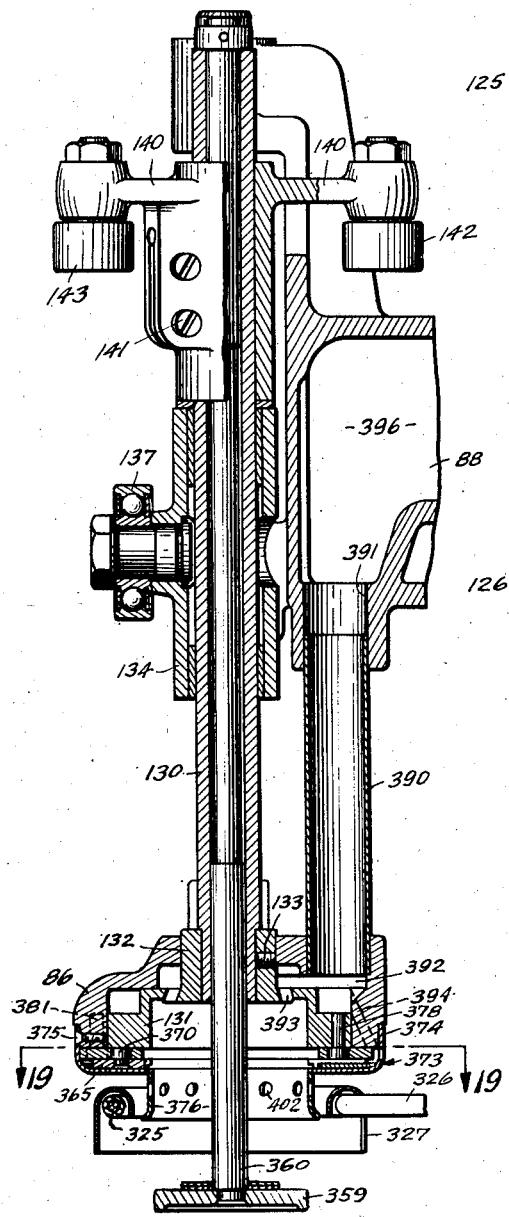
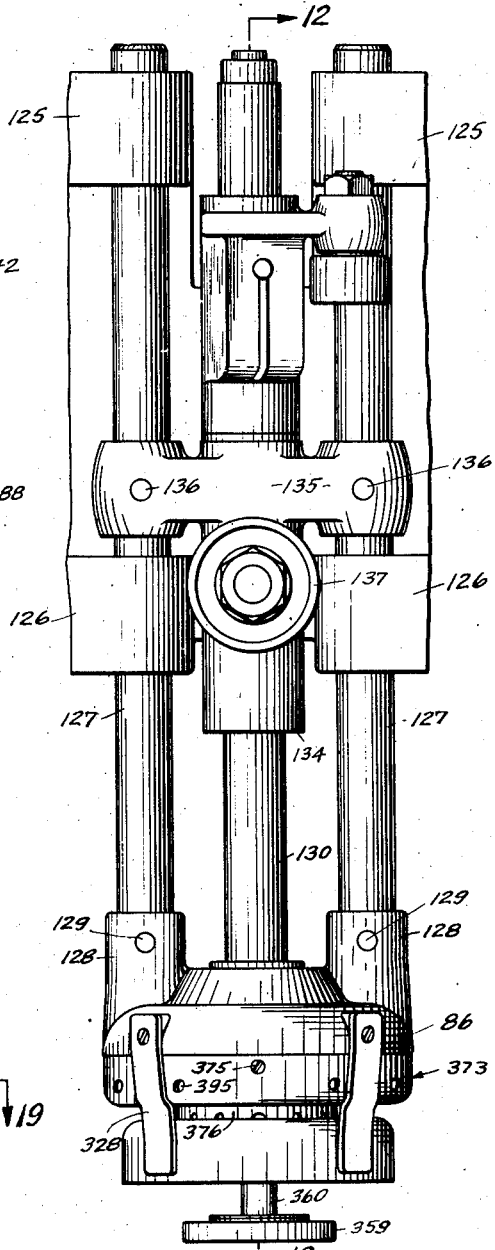
INVENTOR:
Edward N. Lowry,
BY Bodell & Thompson
ATTORNEYS.

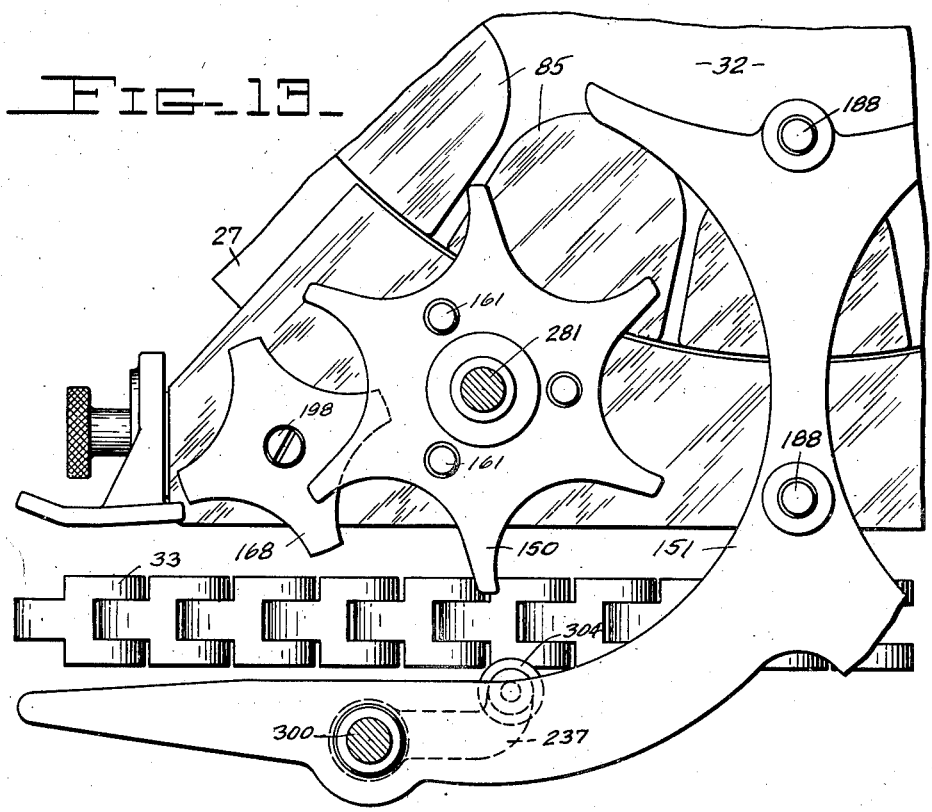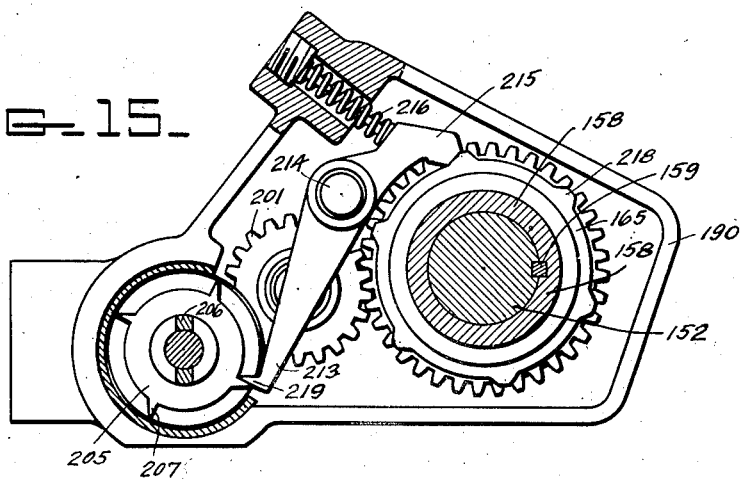

Aug. 8, 1944. E. N. LOWRY 2,355,385
MACHINE FOR APPLYING CLOSURES TO BOTTLES
Filed Feb. 23, 1940 12 Sheets-Sheet 11
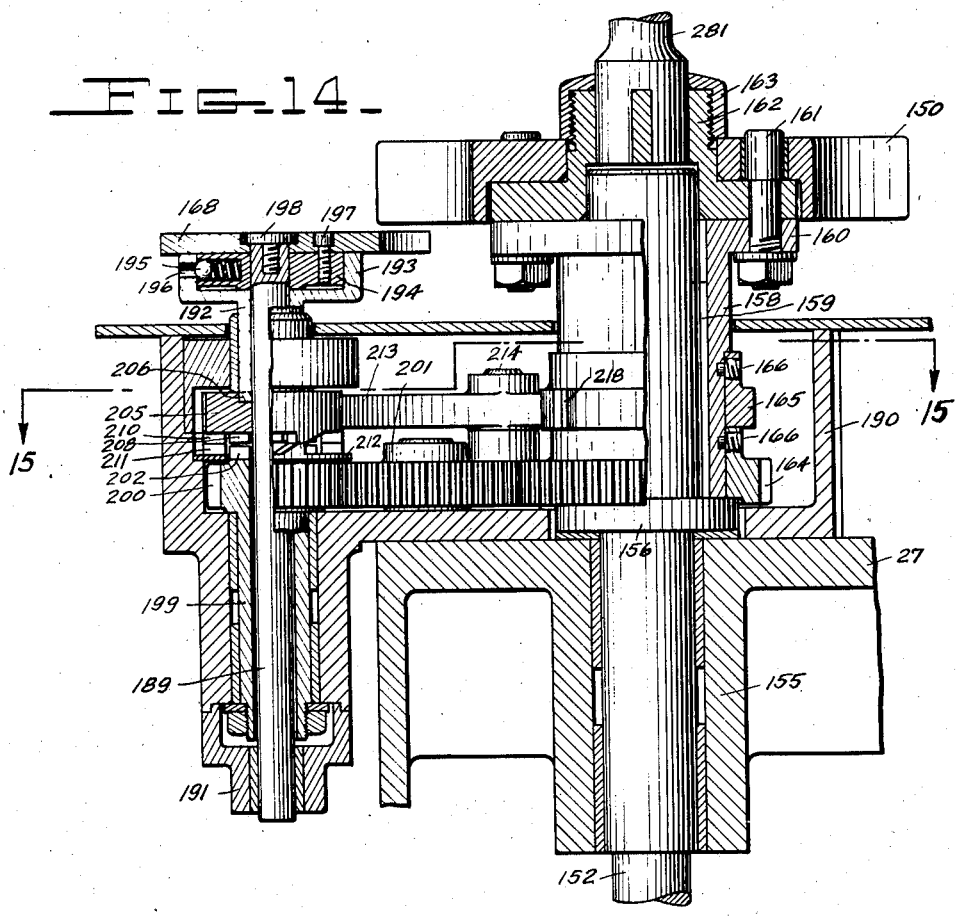
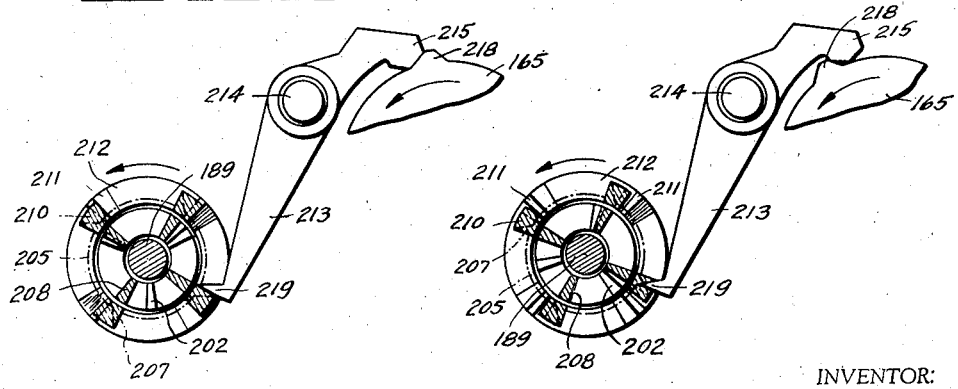
INVENTOR:
Edward N. Lowry,
BY Bodell & Thompson
ATTORNEYS.

Aug. 8, 1944. E. N. LOWRY 2,355,385
MACHINE FOR APPLYING CLOSURES TO BOTTLES
Filed Feb. 23, 1940 12 Sheets-Sheet 12
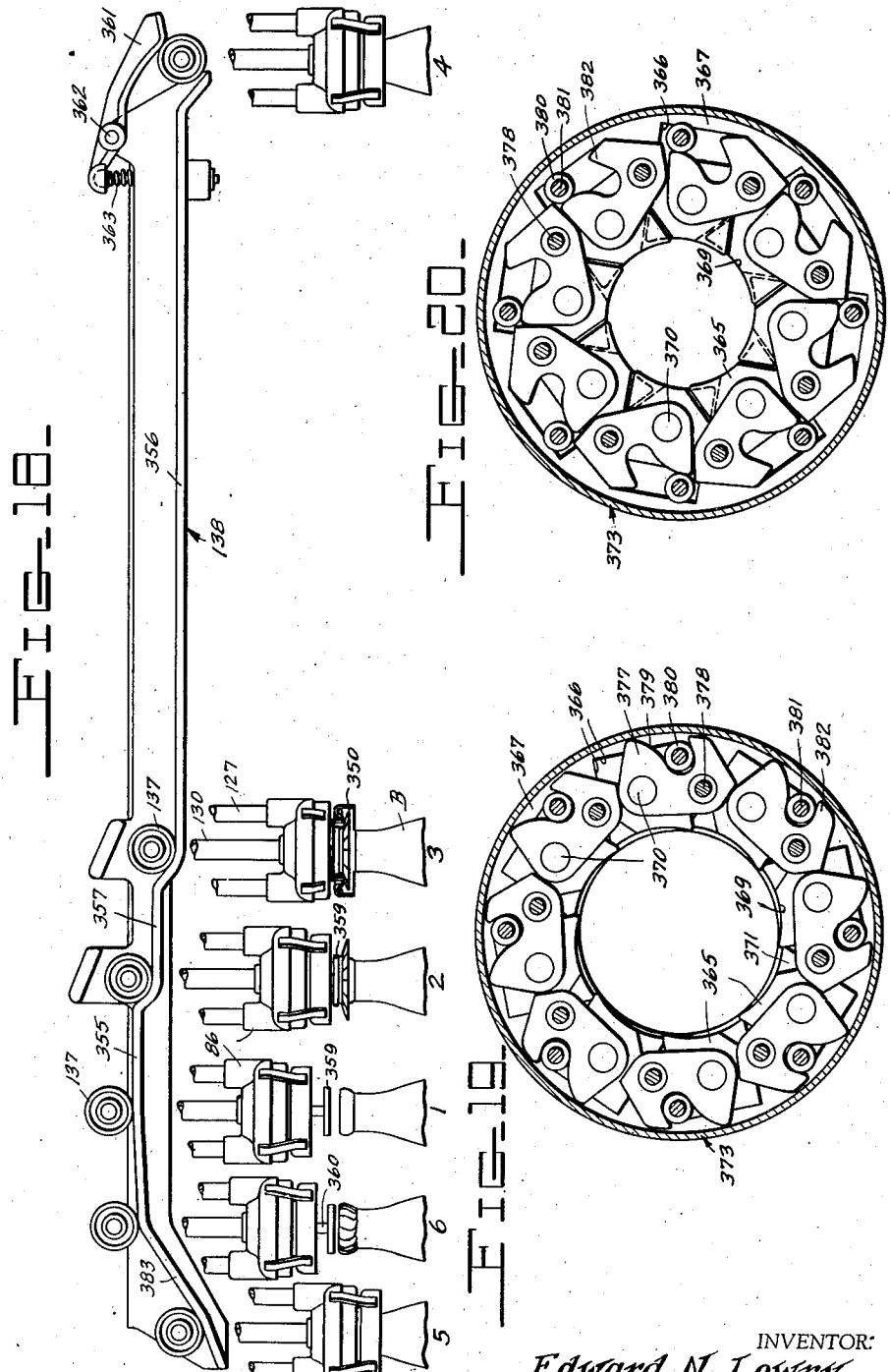
INVENTOR:
Edward N. Lowry,
BY Bodell & Thompson
ATTORNEYS.

Patented Aug. 8, 1944

2,355,385

UNITED STATES PATENT OFFICE 2,355,385

MACHINE FOR APPLYING CLOSURES TO BOTTLES

Edward N. Lowry, Syracuse, N. Y., assignor to Oswego Falls Corporation, Fulton, N. Y., a corporation of New York Application February 23, 1940, Serial No. 320,366

17 Claims. (Cl. 226—83)

This invention relates to a machine for applying hood caps to containers or bottles and embodies certain features which renders the machine particularly adapted for the application of hood caps, the skirts of which caps are coated with a substance rendered adhesive by the application of heat to make the caps self-securing on the bottles.

The invention has as an object a machine of the type referred to embodying a particularly compact structure operable to apply the caps to the bottles at a comparatively high speed, the machine being capable to apply 140 or more caps per minute without breakage or damage to the bottles.

The invention has as a further object the provision of means for heating the skirt portion of the caps after the same have been deposited on the tops of the bottles, the caps being heated during the advancement of a procession of bottles.

A further object of the invention embodies means for maintaining the caps in an atmosphere of proper humidity during the heating and contracting operations.

The invention further involves a structure operable to maintain the operating parts of each of the cap contracting heads at proper temperature so as not to interfere with the capping operation.

The invention consists in the novel features and in the combinations and constructions hereinafter set forth and claimed.

In describing this invention reference is had to the accompanying drawings in which like characters designate corresponding parts in all the views.

Figure 4 is a view, similar to Figure 3, taken on a line extending just above the tops of the bottles on the turret of the machine.

Figure 5 is a transverse sectional view taken on substantially line 5—5, Figure 2, with the motor of the head cooling mechanism and parts shown in top plan.

Figure 6 is a top plan view of the drive for the cap dispensing mechanism, the cover of the housing enclosing the same being removed.

Figure 7 is a side elevational view of the drive mechanism shown in Figure 6 with the front side of the housing removed.

Figure 8 is an enlarged fragmentary detail of the clutch operating mechanism of the drive shown in Figures 6 and 7.

Figure 11 is a side elevational view of one of the cap contracting heads and contiguous supporting mechanism.

Figure 12 is a vertical sectional view taken substantially on line 12—12, Figure 11.

Figure 13 is a top plan view of the bottle feeding mechanism and contiguous portion of the machine and bottle conveyor.

Figure 14 is a vertical sectional view of the bottle feed mechanism.

Figure 15 is a view taken substantially on line 15—15, Figure 14.

Figure 16 is a detail view of the arrangement of the cam surfaces of the bottle feed drive mechanism when the same is inactive.

Figure 17 is a view, similar to Figure 16, illustrating the arrangement of the cam surfaces of the mechanism when a bottle is ready to be fed into the machine.

Figure 18 is a diagrammatic view of the head raising and lowering cam progressed on a flat surface.

Figure 19 is a view taken on line 19—19, Figure 12, illustrating the cap contracting mechanism in expanded position.

Figure 20 is a view, similar to Figure 19, illustrating the cap contracting mechanism in contracted condition.

Figure 1:
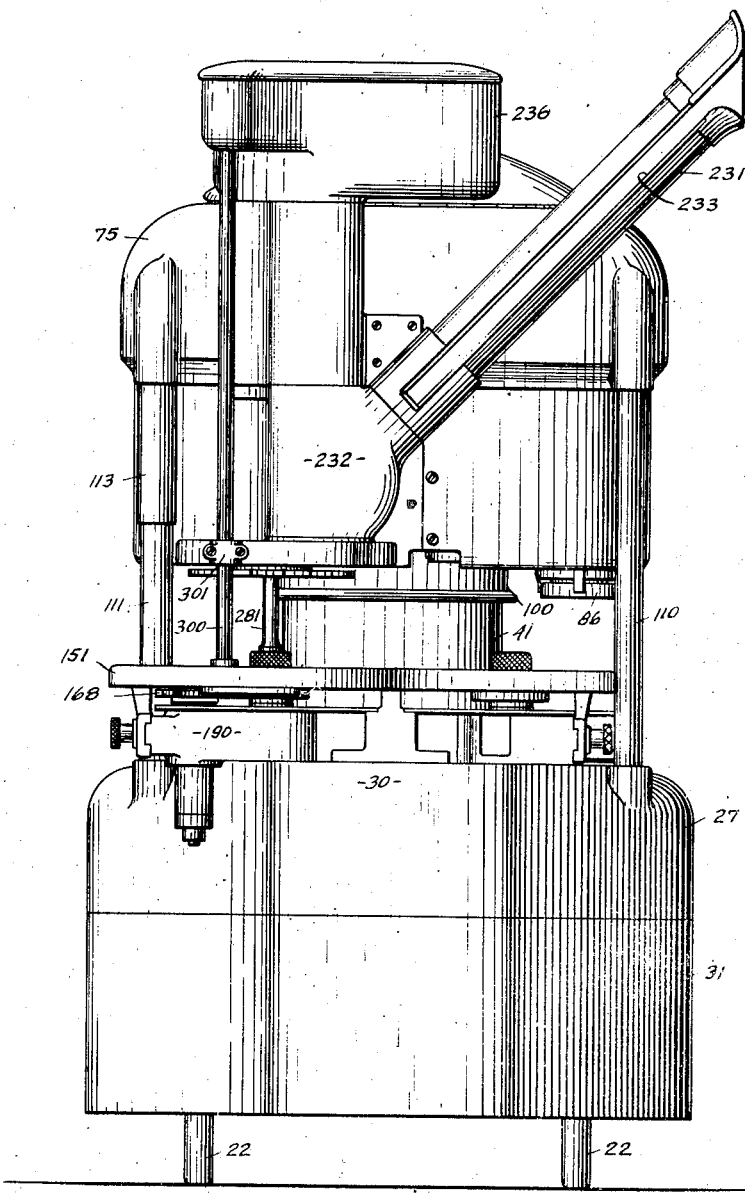
Figure 1 is a front elevational view of a machine embodying my invention.

The embodiment of the invention here shown comprises a lower base section 20 provided with a plurality of upwardly extending bosses 21 in which are slidably mounted supporting legs 22. The upper portion 23 of each of the bosses 21 is of reduced section formed with a top portion 24 threaded to receive an adjusting screw 25, the lower end of which coacts with the upper ends of the legs 22 for the purpose of leveling the machine on the floor.

The base section 20 is also formed with three intermediate bosses 26 employed to support an upper base section 27. The upper section 27 is provided with a plurality of inwardly extending bosses 28 which engage and rest upon the bosses 26, and the sections are secured together as by cap screws 29. The base sections 20, 27 are of substantially circular formation having a flattened portion 30 on the forward side of the machine, and the periphery of the lower section is encircled by a band 31 of sheet metal to prevent the entrance of moisture in the base and to give the machine an attractive appearance.

The bottles are carried by a circular turret 32 journalled upon the top of the upper base section 27, the bottles being fed onto the turret from a conveyor 33, and after the bottles are capped they are returned to the conveyor, the conveyor extending horizontally across the front flat section 30 of the base. The upper base section 27 is provided with a central hub portion 34 in which is rotatably journalled a nut 35. The nut 35 is threaded internally to receive a vertically arranged tubular supporting column 36 which carries the super-structure of the machine. The nut is formed with a shoulder 37 intermediate the ends to prevent downward displacement of the nut under the load of the turret and superstructure of the machine.

The turret 32 is formed with an upwardly extending cylindrical portion 41 and a hub portion 42 rotatably mounted upon the upper portion of the nut 35 and supported by a thrust bearing 43 mounted in the upper end of the hub 34 of the base. The turret is formed with a plurality of webs 44 of general triangular formation extending between the cylindrical portion 41 and the hub 42. A ring gear 45 is secured to the turret as by screws 46 and is arranged concentrically of the nut 35.

The machine is operated by a motor 50 arranged in the lower base section and which is operatively connected to a shaft 51 journalled in a bracket 52 secured to the base section 20, as by a belt 53 trained over an adjustable speed pulley 54 carried by the motor and a driven pulley 55 carried on one end of the shaft 51. The opposite end of the shaft is provided with a worm 56 arranged to mesh with a worm gear 57 secured to a vertically extending shaft 58 journalled in a bracket 59. The shaft 58 is provided with an extension 60, the upper end of which is journalled in a bearing 61 arranged in the top of the upper base section 27, and the upper end of the shaft 60 is provided with a driving pinion 62 arranged in mesh with the ring gear 45. In this manner, rotation of the turret 32 is effected.

The super-structure of the machine consists of a cylindrical member 70 secured at its lower end to the upper end of the tubular column 36 as by screw 71. The upper end of the member 70 is formed with an annular flange 73 supported by a plurality of radially extending ribs 74. The member 70 in a manner forms an extension of the column 36 and provides a support for the top section 75 of the machine. The top section 75 is formed with an annular hub portion 76 from which a plurality of U shaped ribs 77 radiate upwardly and outwardly to merge with a substantially cylindrical portion 78. Intermediate the inner hub 76 and the outer cylindrical portion 78, the section is also formed with a dome-shaped wall 80, and the hub 76 formed with a depending curved annular flange 81.

The turret 32 is formed with a plurality of circumferentially spaced apart bottle pads 85 and a cap contracting head 86 is arranged above each of the pads 85, the heads 86 being carried by a head supporting member which is rotatable in unison with the turret 32. The head supporting member is formed with a central hub portion 88 having a plurality of ribs 89 depending therefrom and converging to form a lower bearing receiving member 90. A plurality of ribs 91 extend upwardly and converge to form an upper bearing receiving member 92. An anti-friction bearing 94 is arranged in the upper member 92 with the bearing encircling the upper portion of the member 70. A bearing 95 is arranged in the lower member 90 encircling the lower end of the member 70, and metallic spacing sleeves 96 and a plurality of sleeves 97 formed of insulating material are interposed between the bearings 94, 95, the assembly being retained upon the sleeve 70 by an annular nut member 99. A cylindrical member 100 is secured to the under side of the hub portion 88 and is formed to telescope on the cylindrical member 41 carried by the turret 32. The turret 32 is employed to effect rotation of the head supporting member, this being accomplished by a key 101 secured to the periphery of the cylindrical member 41 and arranged cooperable with a vertically extending keyway 102 formed in the bore of the cylindrical member 100.

A ring gear 103 is secured to the lower end of the nut 35 and is arranged in mesh with a pinion 104 carried on the inner end of a horizontally extending shaft 105 journalled at its inner end in a bearing 106 secured to the under side of the top base section 27 and being journalled at its outer end in the periphery of the base section 27 and provided with a surface 107 to receive a crank, or other means, for rotating the shaft. Upon rotation of the shaft 105, rotation of the nut 35 is effected and the column 36, the supporting sleeve 70, and the top section 75, are adjusted axially relative to the turret 32.

Figure 2:
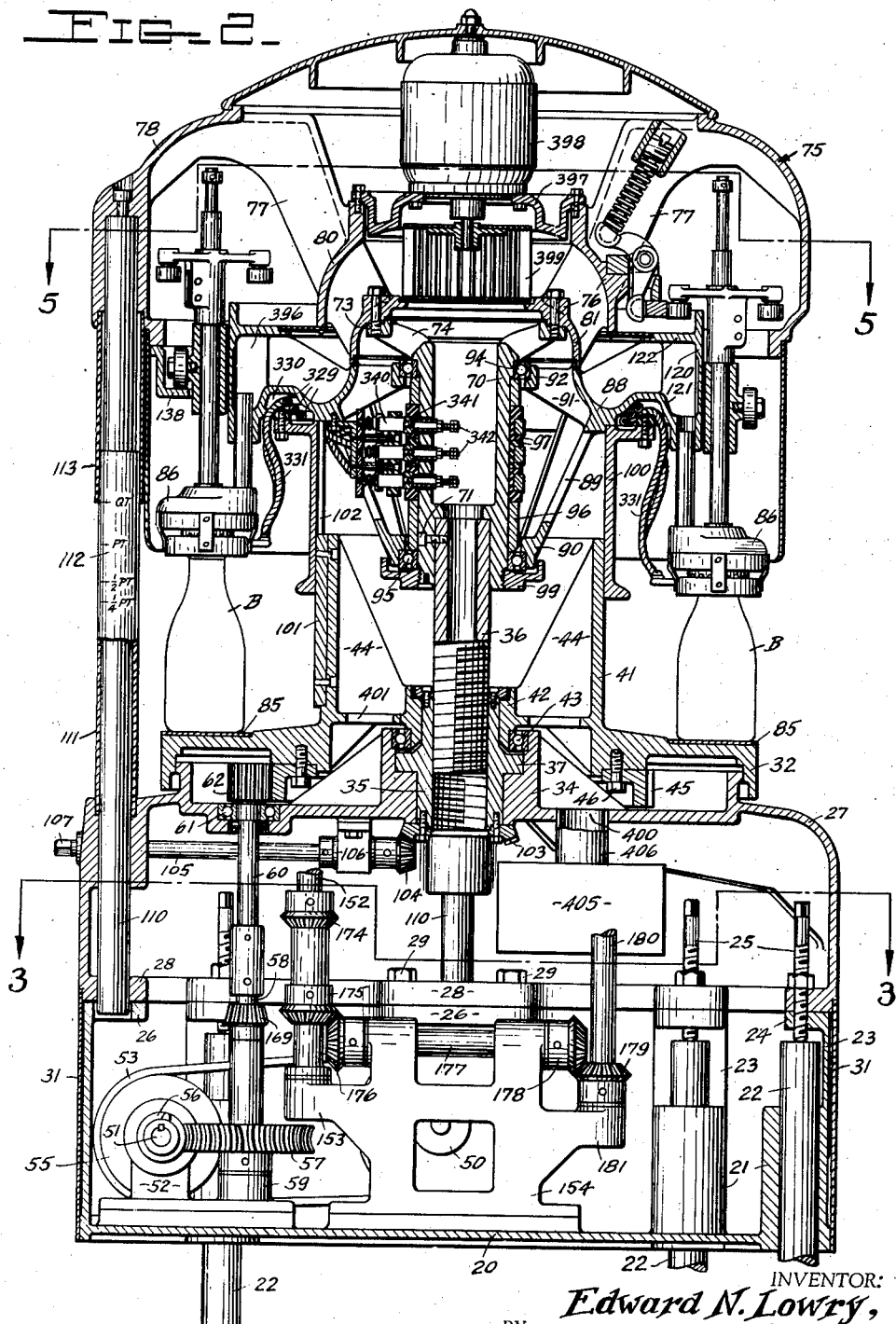
Figure 2 is a vertical sectional view with parts of the drive mechanism shown in elevation and parts omitted, the view being taken on a section corresponding to line 2—2, Figure 5.

The top section 75 is held against rotation by three posts 110 depending therefrom and being slidably arranged in apertures formed in the upper base section 27. One of the posts 110 is encircled by a sleeve 111 on which legends are applied as at 112, Figure 2, to indicate the different sizes of bottles. These legends are applied to the sleeve 111 to properly register with the lower end of a sleeve 113 depending from the top section 75, the lower end of which telescopes over the upper end of the sleeve 111.

The machine is constructed to apply caps to bottles of one quart, one pint, one-half pint and one-quarter pint capacity. The entire superstructure of the machine is adjusted vertically to accommodate these bottles of different height by rotation of the shaft 105 which effects vertical movement of the column 36 and all of the structure supported thereby including the head carrying member and the top section 75. The head supporting member is formed at its periphery with a cylindrical portion 120, the lower edge of which is connected to the hub 88 by an irregular shaped flange 121. The peripheral portion 120 is formed with an inwardly extending annular flange 122 and is formed at its periphery with a plurality of circumferentially spaced apart upper and lower bosses 125, 126. Each of the bosses 125, 126 is provided with two alined apertures to slidably receive the head carrying rods 127.

Each of the heads 86 includes a circular body member formed with a pair of upwardly extending bosses 128 to receive the lower ends of the rods 127, the rods being secured to the head as by pins 129. The heads also include a tubular shaft 130 arranged centrally of the head and extending upwardly in parallel relationship to the rods 127. The bodies of the heads are recessed to receive an annular member 131 having a hub portion 132 secured to the lower end of the tubular shaft 130, as by set screws 133. The annular member 131 is rotatably mounted in the head.

The upper portion of the tubular shaft 130 is rotatably journalled in a sleeve 134 formed at its upper end with a transversely extending portion 135 which is provided at its ends with apertures to receive the rods 127 and is secured thereto as by pins 136. Each of the sleeves 134 is provided with an outwardly extending antifriction roller 137 which coacts with a cam track 138 for the purpose of raising and lowering the heads, as will be hereinafter described.

An arcuate member 140 is adjustably secured intermediate its ends to the upper portion of each tubular shaft 130 as by clamping screws 141. The members 140 extend laterally from the shaft 130 and are provided at their inner ends with antifriction rollers 142, and at their outer ends with rollers 143. The rollers 142, 143 coact with arcuate cam tracks 144, 145 to effect oscillation of the members 140 and relative rotation between the annular members 131 in the heads and the bodies of the heads. The cam track 144 effects closing of the heads to contract the skirt of the cap about the top of the bottle, and the track 145 moves the heads to open position.

The arrangement is such that the tubular shaft 130 extends intermediate a pair of adjacent bosses 125, 126. One of the head carrying rods 127 of each head is slidably mounted in one pair of apertures of one set of bosses 125, 126, and the other rod 127 of the head is slidably mounted in the apertures of the adjacent bosses 125, 126, see Figures 5 and 11. The transversely extending portion 135 of sleeve 134 is arranged on the rods 127 intermediate the upper and lower bosses 125, 126, the bosses 126 serving as a downward stop for the head. Upon rotation of the turret 32 and the head carrying member, the heads are moved vertically toward and from the turret and the annular members 131 are rotated relative to the heads once during each cycle of the turret and head carrying member.

The bottles are conveyed to and from the machine by the conveyor 33 previously referred to, the conveyor traveling from left to right Figures 4, 5 and 13. The bottles are fed from the conveyor chain 33 onto the bottle pads 85 of turret 32 by a star wheel 150 and a guide 151 coacting therewith. The star wheel 150 is arranged intermediate the conveyor chain 33 and the turret 32 with the points of the wheel extending partially over each of these elements.

The star wheel 150 is detachably mounted upon the upper end of a shaft 152 arranged vertically in the base with the lower end journalled in a boss 153 of a bracket 154 mounted in the base 20. The upper portion of the shaft 152 is journalled in a bearing 155 formed in the top wall of the upper section 27. The shaft 152 is provided with a collar 156 engaging the top surface of the upper section 27, and a sleeve 158 is mounted upon the upper end of the shaft 152 and secured against rotation relative thereto by a key 159. The upper end of the sleeve 158 is provided with a flange 160 formed with a plurality of circumferentially spaced apart apertures to receive bolts 161 employed to attach a collar 162 to the flange 160 of sleeve 158. The heads or upper ends of the bolts 161 extend upwardly beyond the flange of the collar 162, and the star wheel 150 is provided with apertures spaced complemental to the spacing of the bolts 161, whereby the star wheel 150 is detachably mounted upon the sleeve 158. The apertures in flange 160 are elongated circumferentially to permit adjustment of the collar 162 and star wheel 150 relative to shaft 152. The star wheel is secured against misplacement by a nut 163 threading upon the collar 162.

A driving gear 164 is secured to the lower end of the sleeve 158 and a cam 165 is positioned immediately above the gear 164, both the gear and the cam being secured to the sleeve as by set screws 166. The gear 164 and cam 165 are employed to operate a bottle timer 168, as will be hereinafter described.

Figure 3:
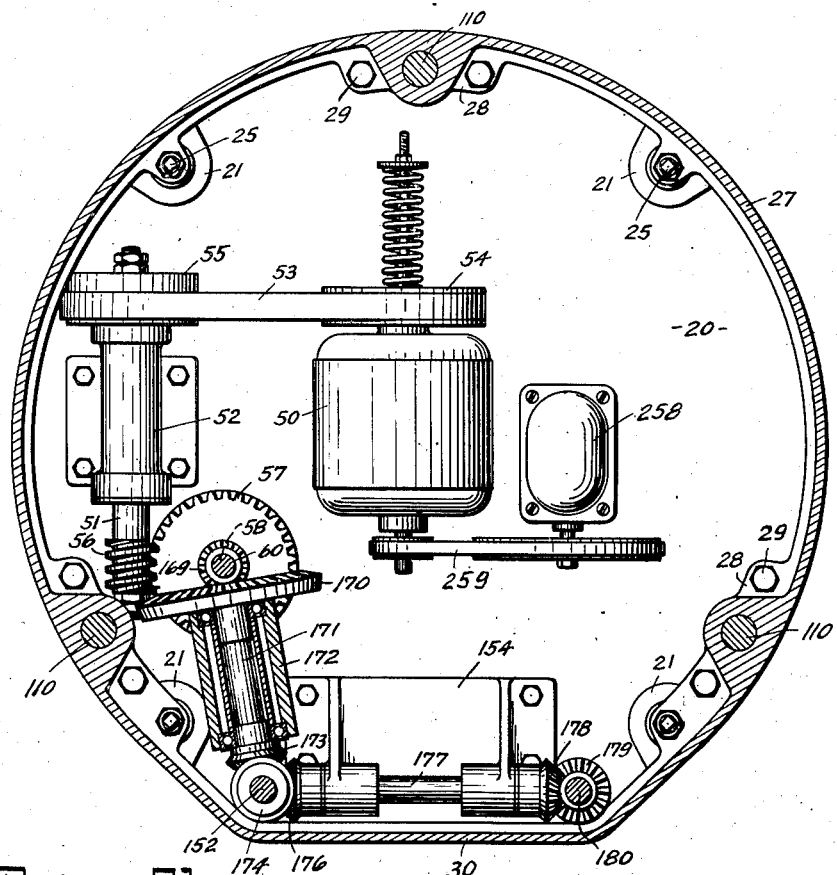
Figure 3 is a transverse sectional view taken substantially on line 3—3, Figure 2.
Figure 21:
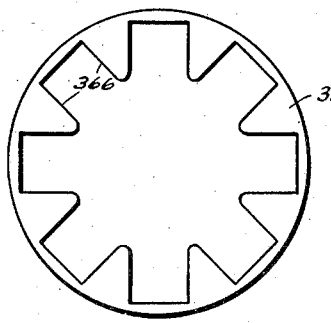
Figure 21 is a plan view of the guide plate in which the cap contracting members are mounted.
Figures 22, 23:
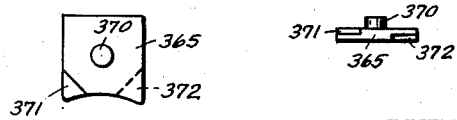
Figure 22 is a plan view of one of the cap contracting members.
Figure 23 is an end view of a cap contracting member looking to the left Figure 22.

The shaft 152 is rotated in timed relation to the rotation of the turret 32. A pinion 169 is mounted upon the vertical shaft 59 and is arranged to mesh with a gear 170 mounted upon one end of a horizontally extending shaft 171 journalled in a bracket 172 mounted upon the base 20. The opposite end of the shaft 171 is provided with a pinion 173 arranged to mesh with a pinion 174 mounted upon the shaft 152, see Figures 2 and 3. The shaft 152 is also provided with a pinion 175 arranged to mesh with a pinion 176 secured to one end of a shaft 177 mounted in bracket 154 and provided at its opposite end with a pinion 178 arranged to mesh with a gear 179 secured to the lower end of a shaft 180 vertically arranged in the base and having its lower end journalled in a boss 181 of bracket 154, see Figure 2. The drive from shaft 58 to shaft 152 is omitted in Figure 2 to avoid confusion in that view.

An out-feed star wheel 182 is detachably mounted upon the upper end of shaft 180 in a manner similar to the mounting of the in-feed star wheel 150. The gearing described functions to rotate the shafts 152, 180 in unison and in timed relation with the rotation of turret 32. The guide 151 is detachably mounted upon studs 188 extending upwardly from the top of the upper base section 27 and coacts with the in-feed star wheel 150 and the out-feed wheel 182 to feed the uncapped bottles from the conveyor 33 to the turret 32, and the capped bottles from the turret 32 back to the conveyor 33.

Due to the fact that the bottles advanced by the conveyor 33 are not uniformly spaced, or not in proper timed relationship to the operation of the in-feed star wheel 150, the bottle timer 168 is provided to effect proper timed movement of the uncapped bottles into the concavities of the star wheel 150. The timer 168 is in the nature of a small star or gate wheel, and is here shown as provided with a lesser number of concavities or pockets than the in-feed star wheel 150. The timing wheel 168 is arranged upon the upper end of a shaft 189 vertically journalled in a housing 190 mounted upon the base 27. The lower end of the shaft is rotatably journalled in a bearing cap 191. A sleeve 192 is rotatably mounted upon the upper end of the shaft 189 and is formed with an enlarged annular portion 193 to receive a clutch member 194.

The clutch member 194 is in the nature of a disk provided with a central aperture to freely receive the upper end of the shaft 189, and with a radially extending aperture to receive a ball 195 spring actuated outwardly. The annular portion of sleeve 192 is provided with an aperture 196 with which the ball 195 coacts to form a slip clutch drive between the sleeve 192 and the clutch member 194. The timing wheel 168 is detachably mounted upon the driven clutch member 194, as by screw 197, and to the end of shaft 189 by screw 198.

A sleeve 199 is rotatably mounted in the lower portion of the housing 190 and is formed at its upper end with gear teeth 200 forming a gear meshing with an idler gear 201 which, in turn, is arranged to engage with the gear 164. Accordingly, during rotation of the turret 32, the sleeve 199 is continually rotated in a counterclockwise direction, Figure 15. The upper surface of the sleeve 199, above the gear teeth 200, is formed with clutch teeth 202.

Means is provided for clutching the sleeve 192 to the sleeve 199 in order to effect proper synchronized movement of the timer wheel 168 and the star wheel 150. This is accomplished by an intermediate member 205 rotatably mounted upon the shaft 189. The upper side of the member 205 is formed with a transversely extending recess to receive opposed prongs 206 formed on the bottom end of sleeve 192, whereby the timer wheel 168 is rotated upon rotation of the intermediate clutch member 205.

The periphery of the member 205 is formed with four teeth 207, and the under side of the member 205 is formed with an inner and outer series of cam teeth. The inner series of cam teeth consists of four teeth 208 which are arranged for engagement with the teeth 202 formed on the upper end of sleeve 199. There are three teeth 202 equally spaced apart circumferentially. The outer series of teeth, formed on the bottom side of member 205, consists of four equally spaced teeth 210. These teeth are arranged to engage four equally spaced teeth 211 carried by an annular member 212 secured against rotation in the housing. The stationary teeth 211 coact with the outer series of teeth 210 to raise the intermediate clutch member 205 upwardly so that the teeth 208 are out of engagement with the driving teeth 202, see Figure 14. The member 205 is normally maintained in this position by a pawl 213 pivotally mounted intermediate its ends on a pin 214. The inner end 215 of the pawl is yieldingly urged into contact with the cam 165 by spring 216, see Figure 15.

The cam 165 is provided with six equally spaced lobes 218. Accordingly, upon rotation of the sleeve 158, the pawl 213 is oscillated about the pivot pin 214. Normally, the tooth 219 of the pawl is arranged in engagement with one of the teeth 207 holding the clutch member 205 from rotation and maintaining it with the teeth 210 positioned on top of the teeth 211.

When the inner end 215 of the pawl is engaged by a cam lobe 218, the tooth 219 of the pawl is moved out of engagement with the teeth 207 permitting the member 205 to be rotated, by a bottle moving on conveyor 33, to move the teeth 210 off from the top of the teeth 211. Thereupon the member 205, together with sleeve 192 and gate wheel 168, is permitted to drop bringing one of the teeth 208 into engagement with one of the driving teeth 202.

It will be understood that the conveyor 33 is usually operated by a separate motor and not in timed relation with the capping machine. In other words, the conveyor 33 runs continuously in order to convey the filled bottles from the filling machine. Accordingly as a bottle is conveyed by the conveyor 33, it engages one of the arms of the gate wheel 168. As previously pointed out, the gate wheel is locked against rotation by the tooth 219 being in engagement with one of the teeth 207. The tooth 219 is moved out of engagement with the teeth 207 in timed relation to the operation of the machine and upon disengagement of the tooth 219, the gate wheel 168 is driven under power and in timed relation with the machine particularly the star wheel 150, whereby the bottle is moved in proper timed relation to enter one of the pockets of the star wheel 150.

In order that this operation just described may be performed in very accurate timed relation, the teeth 207 and the tooth 219 are so shaped that upon movement of the tooth 219 toward the axis of the member 205, this member is urged in a forward or counterclockwise direction, Figures 15, 16 and 17. This feature is of importance as it assures movement of the teeth 210 off the teeth 211, thereby permitting the member 205 to drop and permitting the first available driving tooth 202 to engage a tooth 208. In other words, the member 205 is released in timed relation to the star wheel 150 and is positively urged forward in timed relation to the star wheel. That is, each bottle engages the gate wheel 168 and thereafter the conveyor chain 33 slips under the bottom of the bottle effecting somewhat of a pressure against the arm of the gate wheel so that immediately upon outward movement of the tooth 219 on the pawl 213, the gate wheel is moved by the bottle. However, inasmuch as the confronting edges of the teeth 207 and the tooth 219 are practically knife edges, this movement need only be a very few thousandths of an inch, which would not be sufficient to move the teeth 210 off from the teeth 211. However, continued pressure by the bottle is not relied upon to effect the necessary further movement of rotation of the gate wheel, but this is accomplished by the angularity of the back sides of the teeth 207 and tooth 219. The result is that this mechanism operates with extreme accuracy to time the movement of the bottle onto the pockets of the star wheel 150.

A supply of caps 230 are arranged in stack formation in a tubular member 231 extending at an angle from a housing 232 arranged on the front of the machine. The tube 231 is formed with an axially extending slot 233 to indicate the quantitay of caps in the supply and to facilitate the removal of caps from the tube when it is desired to do so. The lower end of the tube is formed with an inwardly extending annular flange 234 which serves to support the stack of caps in the tube.

As each bottle is moved from the conveyor 33 to the turret 32 by the in-fed star wheel 150, the lowermost cap of the stack formation is removed from the tube 231 and deposited on the top of the bottle. This transfer is accomplished by transfer mechanism arranged in the housing 232 and which is operated in timed relation to the turret 32, the operating mechanism being arranged in a housing 236 mounted on the top of the top section 75. The operating mechanism is actuated by a bottle actuatable controller 237 arranged to be engaged by the bottle as the same is moved off from the conveyor 33 onto the turret 32.

The transfer mechanism consists of a block 240 movably mounted upon a roller 241. The roller 241 is arranged in an elongated slot 242 formed in the block 240, the roller being rotatably mounted upon a screw 243. The block is mounted on the roller 241 by a large washer 244 overlying the face of the block. The screw 243 is threaded into a cam block 245 which is formed with a curved slot 246 terminating at its lower end in a vertically extending slot 247 and at its upper end in a slot 248 extending substantially axial of the tube 231. The block 240 is provided with a roller 249 arranged to travel in the slots 246, 247 and 248. A suction cup 250 is secured to one end of the block and is connected to the stationary member 251 of a valve mechanism by a flexible tube 252. A link 253 is also pivotally connected to the same end of the block 240 as by screw 254. The upper end of the link 253 is connected to a rock arm 255 journalled in the upper housing 236 on a shaft 256.

Figure 9:
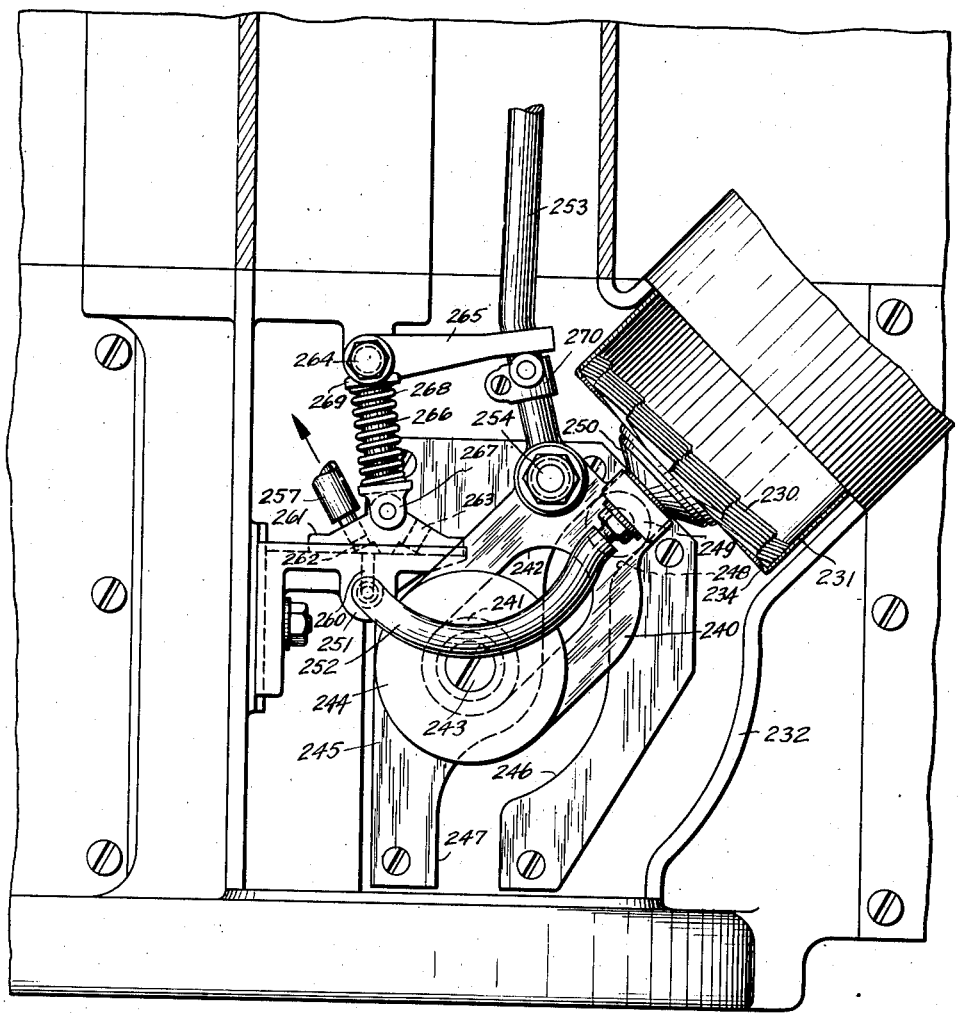
Figure 9 is a front elevational view of the transfer movement of the cap dispensing mechanism and contiguous portion of the magazine tube, the front side of the housing enclosing the same being removed.

The operating mechanism in the housing 236 effects oscillation of the arm 255 and accordingly, vertical reciprocable movement of the link 253. Normally, the block 240 is positioned with the suction cup 250 in engagement with the lowermost cap of the stack formation, as indicated in Figure 9. In this position, the tube 252 is connected to the tube 257 which extends to a vacuum pump 258 arranged in the base 20 and which is driven by the motor 50 through a belt 259.

Referring to Figure 9, the stationary valve member 251 is provided with a port 260 which is connected to the flexible tube 252. The movable valve member 261 is provided with a vacuum port 262 and with an exhaust port 263. The movable member 261 is slidably arranged on the stationary member 251 and is operated by an angle lever pivoted at 264 and which is formed with a laterally extending arm 265 and a downwardly extending arm 266. A block 267 is slidably mounted upon the lower end of the arm 266 and is pivotally connected to the movable member 261.

Figure 10:
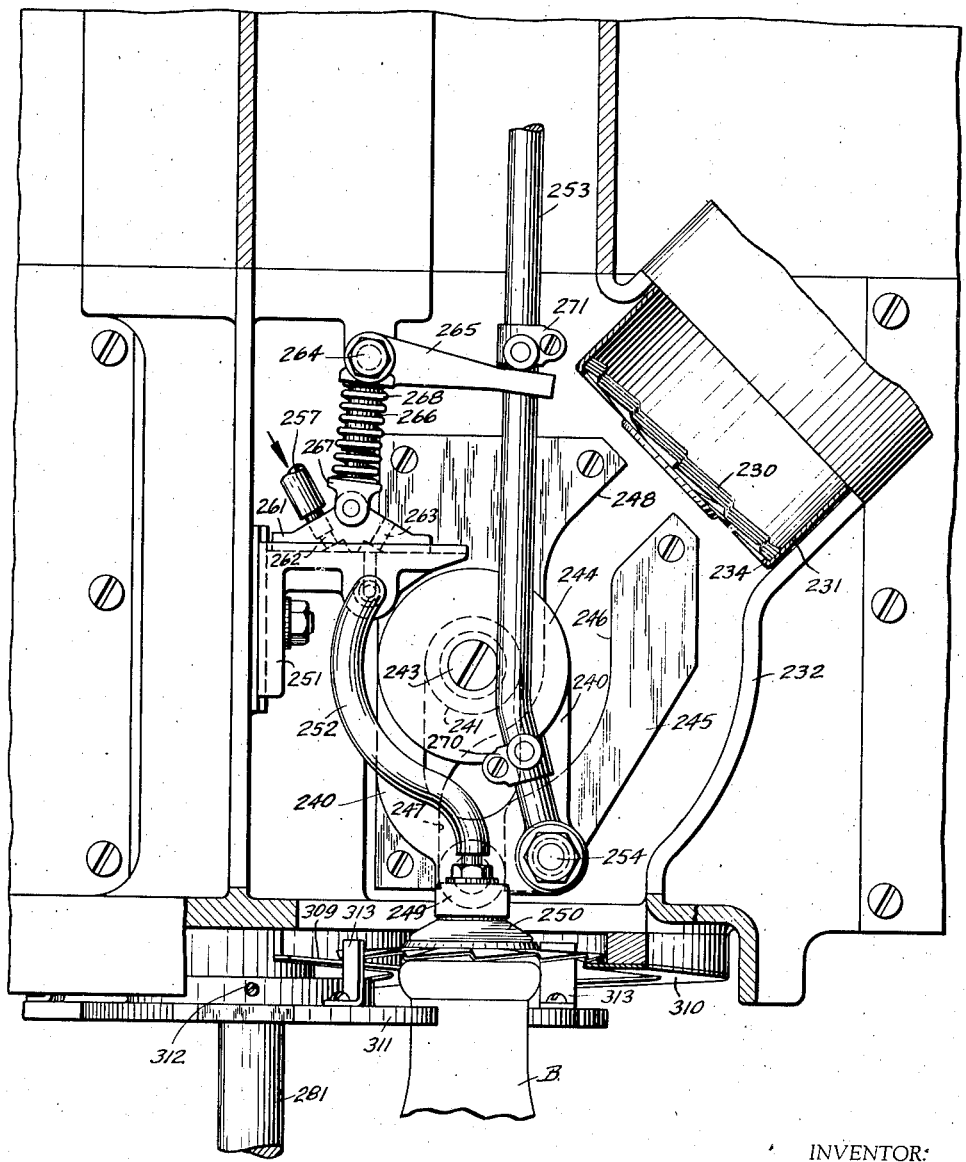
Figure 10 is a view, similar to Figure 9, illustrating the position of the cap transfer mechanism when a cap has been transferred from the cap supply to the top of the bottle.

A helical compression spring 268 is arranged on the arm 266 and interposed between a shoulder 269 and the block 267 and functions to yieldingly maintain the movable member 261 in engagement with the top surface of the stationary valve member 251. The valve angle lever is oscillated about the pivot 264 by a pair of collars 270, 271, both of which are adjustably secured to the link 253. Upon upward movement of the link 253, the lower collar 270 engages the arm 265 moving the valve member 261 to the right, Figure 9, connecting the vacuum port 262 with the port 260. Accordingly, the lowermost cap of the stack formation is secured to the suction cup 250 until the block 240 has been moved about the roller 241 to substantially vertical position, during which movement the lowermost cap is withdrawn from the tube 231 and is arranged in inverted position, as illustrated in Figure 10, at which time the upper collar 271 engages the arm 265 shifting the valve member 261 to the left bringing the port 263 in register with the port 260 connecting the suction cup to atmosphere and permitting the cap to drop from the cup. It will be observed that the cam slots 246, 247 and 248 are so arranged as to effect a shift of the block 240 from the position shown in Figure 9 to the position shown in Figure 10, with the result that the lowermost cap is transferred from the cap supply.

The operating mechanism for effecting movement of the block 240 consists of the rock arm 255, previously referred to, which is formed integral with an arm 275 and to which a link 276 is pivotally connected at one end and which is pivotally connected at its opposite end to a crank pin 277 carried by the driven member 278 of a one revolution clutch. The clutch member 278 is rotatably mounted upon the upper end of a shaft 279 journalled at its upper end in the housing 236 and journalled at its lower end in the housing 232 at 280. The lower end of the shaft 279 is recessed to slidably receive a shaft 281 which is detachably secured to the collar 162 on shaft 152, see Figure 14. The upper end of the shaft 281 effects rotation of the shaft 279 by a key 282, see Figure 4. A gear 283 is fixed to the upper portion of the shaft 279 and is arranged in mesh with a pinion 284 journalled on a stud 285, the upper end of which is journalled in a bracket 286 in the housing 236. A gear 287 is fixed to the pinion 284 and is arranged in mesh with a pinion 288 freely mounted upon the shaft 279.

A driving clutch section 289 is fixed to the pinion 288 and is formed with a notch 290. The driven clutch section 278 is formed with a peripheral groove 291 and with an axially extending groove in which is mounted a driving key 292. The driving key 292 is urged downwardly by a helical compression spring 293, and the key intermediate its ends is formed with a groove 294, the upper wall of which extends in an angular direction as indicated at 295, Figure 8. The upward movement of the key 292 is limited by a plate 296.

As previously explained, the shaft 152 rotates continuously and in timed relation with the turret 32. Accordingly, the driving clutch section 289 is rotated continuously with the turret and at comparatively high speed because of the gearing 283, 284, 287 and 288. Normally however, the driven clutch section 278 is held stationary in a predetermined position by a pawl 297 pivotally mounted on a stud 298. The free end of the pawl 297 is movable toward and from the axis of the driven clutch member 278 and is arranged in register with the groove 291. The end of the pawl is tapered as at 299, and the pawl is somewhat greater in thickness than the effective width of the slot 294. Accordingly, when the free end of the pawl is arranged in the slot 291, it enters the slot 294 of the driving key 292 and urges the same upwardly against the action of spring 293 into engagement with plate 296. This upward movement of the driving key is sufficient to bring the lower end thereof out of the slot 290 in the driving member 289. Accordingly, the driven member becomes disconnected from the driving member. However, the upward movement of the key 292, as limited by plate 296, is not sufficient for the upper wall of the slot 294 to clear the top surface of the pawl 297 and therefore the driven member is stopped in a predetermined position, as illustrated in Figures 6 and 7, and at which time the cap transfer block 240 is arranged in the upper position, as illustrated in Figure 9.

The pawl 297 is actuated by the bottle actuatable controller 237. This controller is in the nature of an arm secured to the lower end of a shaft 300 journalled in a bearing 301 and journalled at its upper end in the housing 236. An arm 302 is keyed to the upper end of the shaft 300 and is operatively connected to the pawl 297 by a link 303. The free end of the bottle actuatable controller 237 is provided with a roller 304 arranged to be engaged by the body of each bottle as the same passes from the conveyor 33 to the turret 32, see Figure 13.

Accordingly, as each bottle is transferred on the turret by the star wheel 150, the cap transfer operating mechanism is actuated and a cap transferred from the cap supply. The transferred cap is deposited on an inner and outer arcuate track section 309, 310. The track sections 309, 310 are mounted on the lower end of the housing 232 and are arranged concentrically about the axis of the shaft 152 and extend inwardly and downwardly over the bottle pads 85 on the turret 32, see Figures 4 and 10.

A star wheel 311 is secured to the lower end of the shaft 279 as by set screw 312, and is formed with the same number of pockets as the in-feed star wheel 150. However, the pockets in the star wheel 311 are formed to receive the neck portion of the bottles B. The star wheel 311 is provided with cap engaging members 313, and the arrangement is such that when the caps are deposited on the tracks 309, 310, they are moved along the tracks by the members 313. As previously stated, the rear or inner ends of the tracks 309, 310 extend downwardly adjacent the upper surface of the wheel 311, with the result that as the caps are moved along the tracks they descend onto the tops of the bottles. With this mechanism, the caps are placed centrally on the tops of the bottles while they are being fed onto the turret 32. In order to more definitely position the tops of the bottles centrally with the capping heads 86, the tops of the bottles are yieldingly pressed into the pockets of the wheel 311 by a roller 315 carried on the end of a rock arm 316, the opposite end of which is pivoted as at 317. The arm 316 is urged toward the axis of the wheel 311 by a compression spring 318 interposed between the arm and a bracket 319. The roller 315 engages the necks of the bottles at the time the cap is transferred from the tracks 309, 310, to the tops of the bottles.

From the description thus far, it will be apparent that the uncapped bottles are fed in timed relation from the conveyor 33 into the star wheel 150 and onto the bottle pads 85 of turret 32. During the transfer of the bottles from the conveyor to the turret, a cap is deposited on the top of each bottle. The bottles are moved through an orbital path by the turret during which time the caps are heated, the skirt portion folded about the top of the bottles and contracted thereon, and the capped bottles are transferred from the turret back onto the conveyor 33 by the out-feed star wheel 182. The mechanism for heating the caps and contracting the same about the tops of the bottles will be now described.

This mechanism consists of the heads 86, there being a head arranged coaxially above each bottle pad 85, as previously explained, and each head is provided with an individual heating means operable to heat the cap after the same has been placed on the top of the bottle. The heater consists of a rod 325 bent into circular form with the adjacent ends extending laterally as at 326. The heater rod 325 is arranged in an annular reflector 327 supported from the body casting of the head by a plurality of braces 328. The laterally extending ends 326 are arranged to extend inwardly toward the axis of the machine and are connected to three cables 329 arranged in an annular duct 330. The top wall of this duct is formed by the flange 121 of the head carrying member, and the bottom wall is completed by the upper flange of the cylindrical member 109. The heater rods 325 are connected to the cables 329 by flexible conductors 331 extending through apertures formed in the bottom wall of the duct 330.

Each of the cables 329 is connected to a brush 340 carried on the web structure 89 of the head carrying member 88. Each brush 340 is arranged to ride upon a contact ring 341 during rotation of the turret and head member, the rings 341 being mounted upon insulating sleeves 97 interposed between the spacers 96 and encircling the column 70. Each ring 341 is provided with a terminal 342 extending in the bore of the column 70 and the service wires, not shown, are brought upwardly from the base 20 through the column 36 and connected to the terminals 342. The particular electrical installation shown and described is of the three phase type, and the heater rods 325 are connected to the cables 329 so that the load on each phase is substantially balanced.

The caps in the cap supply 230 are of substantially flat disk formation, the peripheral margin 350 being scored, as indicated in Figure 4, in order to facilitate the folding and contracting of the skirt portion of the cap uniformly about the neck of the bottle. Accordingly, when the caps are deposited upon the bottles fed onto the turret 32, they are in this substantially flat form and the heater rods 325 carried by the heads are arranged to overlie the marginal portion 350 of the caps and to heat the same while the bottles and caps are being advanced by the rotation of the turret 32.

During the placement of the caps on the bottles, the heads 86 are elevated slightly above the tops of the bottles. After the caps have been placed on the tops of the bottles, the heads 86 are lowered to heating position and remain in this position during a substantial portion of the travel of the bottles and caps. At the end of this period, the heads are lowered, folding the marginal portion 350 of the cap downwardly about the top of the bottle, and the cap contracting mechanism of each head is then actuated to tightly contract the cap about the neck of the bottle. Subsequently, the heads are elevated and thereupon the bottles are transferred from the turret back onto the conveyer 33 by the star wheel 182. This vertical movement of the heads 86 is accomplished by the circular cam track 138 previously referred to. The cam track 138 is formed with a high portion 355 arranged over the in-feed wheel 150, and with a low portion 356 of considerable extent.

The high and low portions 355, 356 are connected by a short intermediate portion 357. As previously explained, the rollers 137 ride upon the cam track 138. The arrangement of the cam track 138 is such that the heads are elevated by the high portion 355 while the heads are traveling over the in-feed wheel 150. During this time, the bottles B are fed onto the turret and a cap placed upon the top of each bottle. Thereupon, the heads are lowered slightly by the intermediate section 357, with the result that the plunger 359, carried on a stem 360 slidably mounted in each head, is brought into engagement with the cap on the bottle as indicated in position 2, Figure 18. The purpose of the plunger 359 is to hold the cap centrally on the bottle during the heating operation. Thereafter, the roller 137 of each head passes onto the low portion 356 of the cam track permitting the head to descend as indicated in position 3, Figure 18. In this position, the heating rod 325 is located in proximity to the skirt portion 350 of the cap. The heads continue in this heating position during the major portion of the travel of the bottle on the turret, this distance being indicated substantially as 180° in Figure 4. However, the duration of the travel of the bottle and cap during the heating period may vary in accordance with the speed at which the machine is operating, and the material of which the coating on the cap is made.

At the end of the heating period, the rollers 137 are successively moved off from the track by a kicker cam 361 pivoted at 362 and actuated by a compression spring 363. This action permits the heads to descend to full low position, or until the supporting member 135 engages the bosses 126 of the head carrying member, see Figure 11. When the heads have been thus moved downwardly, the marginal portion 350 of the cap is folded about the top of the bottle and thereupon the rollers 142 engage the cam track 144 effecting clockwise rotation of the annular member 131. This clockwise rotation of the member 131 effects inward radial movement of a plurality of cap contracting members 365 which are slidably arranged in radially extending slots 366 formed in an annular guide plate 367.

Each of the cap contracting members 365 is of substantially rectangular formation formed with an inner arcuate edge 369 and being provided with a pin 370 arranged substantially in the center of the member. The inner corners of the cap contracting members 365 are reduced in thickness, one corner being relieved on the upper side as at 371, and the opposite corner being relieved on the lower side as at 372. With this construction, the inner corners of each member overlap the corners of the adjacent members and form, when in closed position as indicated in Figure 20, a substantially continuous jaw to effect even and uniform contraction of the skirt portion of the cap against the neck of the bottle.

The cap engaging members 365 are arranged in the slots 366 of the guide plate 367, the members 365 and the plate being located in an annular member 373 having a cylindrical flange 374 encircling the lower end of the body of the heads 86 and being detachably secured thereto as by screws 375. A cylindrical cap folding member 376 is secured to and depends from the annular member 373 and is flared outwardly at its lower end. The function of the folding member 376 is to fold the marginal portion 350 of the cap about the neck of the bottle when the heads descend under the influence of the kicker cam 361.

The cap contracting members 365 are moved radially by cam members 377. These cam members are pivotally mounted at one end on the pins 370 of the respective cap contracting members, and are pivotally mounted at their opposite ends on pins 378 depending from the annular member 131. The cam members 377 are normally arranged circumferentially, or end to end, and the outer side of each cam member is formed with a slot having a cam surface 379. This cam surface of each cam member is cooperable with a roller 380 mounted upon a pin 381 extending into the body of the head 86. In other words, the pins 381 are stationary and accordingly, when the pins 378 and the cam members are moved in a clockwise direction Figure 19, the free ends of the cam members and the cap contracting members 365 are urged inwardly by the cam surface 379 engaging the rollers 380 mounted on the stationary pins 381. Upon counterclockwise movement of the annular member 131 and pins 378, the cam members are likewise moved in a counterclockwise direction and when the points 382 engage the stationary pins 381, or the rollers 380 carried thereby, the cam members are moved about their pivot pins 378 and the free ends of the cam members and the cap contracting members 365 are moved radially outwardly. Accordingly, as the rollers 142 engage the arcuate cam track 144, the cap engaging members 365 are moved radially inwardly to contract the skirt portion 350 of the cap against the neck of the bottle, and the caps are held in this contracted condition for a short period, or until the rollers 142 reach the end of the track 144 and at the same time, the outer rollers 143 engage the circular track 145 imparting the counterclockwise movement to the annular member 131 and thus move the cap contracting members outwardly to the position shown in Figure 19.

At this time, the capped bottles are approaching the out-feed wheel 182, and the rollers 137 engage the inclined portion 383 of the track 138 causing the heads 86 to be elevated from position 5 to position 6 shown in Figure 18. The capped bottles are now engaged by the out-feed wheel 182 and transferred from the turret to the conveyor 33.

It will be apparent from the description that the machine is operable to transfer uncapped bottles from the conveyor 33 onto the turret 32 and to transfer a cap from the cap supply to the top of each bottle as the same is transferred onto the turret. As the bottles are advanced by the turret, each cap is individually heated while on the bottle and subsequently the marginal portion of the cap is folded about the top of the bottle and contracted and held contracted until the coating on the cap sets sufficiently to make the cap self-securing on the bottle and thereafter, the bottles are returned to the conveyor 33. The caps are heated by the individual heaters carried by each of the cap contracting heads 86. The material with which the caps are coated may be of such a nature as to stick or accumulate on the cap contracting members 365, particularly if these members become heated to any appreciable extent.

My invention includes the provision of means for maintaining the cap contracting members, and associated parts of each head, at proper temperature for the most efficient operation in connection with the particular cap coating material employed. Each of the heads 86 is provided with an aperture in the top side thereof in which a tubular member 390 is mounted. The upper end of the tube is slidably mounted in an aperture 391 formed in the head carrying member 88. The lower end of the tube opens into an annular recess 392 formed in the head above the central portion of the annular member 131 which, in turn, is formed with a plurality of circumferentially spaced apart apertures 393. The body of the head is also formed with a plurality of apertures 394 extending from the recess 392 downwardly and outwardly, as indicated in Figure 12.

The vertical flange of the annular member 373 is also provided with a plurality of apertures 395. The peripheral wall 120 and the flanges 121, 122 of the head carrying member form an annular duct 396 to which the upper ends of the tubes 390 are connected. The annular duct 396 extends upwardly and inwardly between the dome-shaped wall 80 and the depending flange 81 of hub 76. The top of the dome 80 is formed with a circular aperture of appreciable size in which a closure 397 is detachably secured, see Figure 2, and centrally to which is secured a vertically arranged motor 398, the armature shaft of which extends downwardly into the duct 396 and to which is secured a fan 399. The bottom side of the fan is arranged in proximity to an aperture formed in the hub portion 76, and the fan functions to draw air upwardly from the base through apertures 400 formed in the top base section 27, apertures 401 formed in the hub 42 of the turret and upwardly within the cylindrical members 41, 100, through the hub 76 of the top member. This air is expelled through the duct 396 and downwardly through each of the tubes 390. Accordingly, each of the heads 86 is supplied with a constant flow of cool air which is directed over the top of the annular member 131, and also through the passages 394, some of the air passing outwardly through the apertures 395, and some passing about and through the cap contracting mechanism.

When there is no bottle under a head, a portion of the air also passes downwardly through the apertures 393 and through the central portion of the head.

During the cap heating position, as indicated at position 3, Figure 18, the air flowing through the passages 393 is directed outwardly through apertures 402 formed in the cylindrical cap folding member 376. The air is directed through the apertures 402 because in cap heating position the plunger 359 is elevated into the lower end of the cap folding ring 376. Accordingly at all times, including the cap heating period, the entire head mechanism is cooled and accordingly, any accumulation of the adhesive or coating material on the cap is prevented.

In the event the capping machine should be located in an atmosphere having high humidity, means is provided for automatically de-humidifying the air blown through the heads and for automatically maintaining the air at the proper humidity. This means consists of a de-humidifier 405 arranged in the base 20 and connected with the apertures 400 as by ducts 406. The de-humidifier 405 may be of any suitable type and construction.

What I claim is:

1. A machine for applying hood caps to bottles, the skirt portions of which caps are coated with a substance rendered adhesive by the application of heat to make the caps self-securing on the bottles comprising a frame, means operable to advance a procession of bottles with caps positioned thereon, a series of cap contracting members arranged above said bottles, and said members being movable in unison with the procession of bottles, each of said members being provided with a heater unit, said cap contracting members being positioned with the heater unit of each of said members in heat exchanging relation with the cap on the bottle below said member for a predetermined distance of the advancement of the bottles to heat the marginal portion of the cap, and means operable after the heating of the cap to effect relative axial movement between the bottles and said contracting members to fold the marginal portion of the cap about the top of the bottle and contract the folded portion against the top of the bottle, and to subsequently move the contracting members out of engagement with the capped bottles.

2. A machine for applying hood caps to bottles, the skirt portions of which caps are coated with a substance rendered adhesive by the application of heat to make the caps self-securing on the bottles, comprising a base, a turret rotatably mounted on the base and operable to advance a procession of bottles with caps positioned thereon, an annular series of cap contracting heads arranged above the turret with each of said heads positioned in alinement with a bottle on the turret, said annular series of heads being movable in unison with said turret and each of said heads being provided with a cap heating unit, and cam means operable to successively move the heads downwardly to fold the marginal portion of the cap about the top of the bottle, each of said heads being provided with a plurality of cap engaging members operable to contract the folded portion of the cap against the bottle, a blower, a duct extending from said blower to the interior of each of said heads and operable to direct a blast of air from said blower through said heads to effect cooling of said cap engaging members.

3. A machine for applying hood caps to bottles, the skirt portions of which caps are coated with a substance rendered adhesive by the application of heat to make the caps self-securing on the bottles, comprising a frame, means operable for advancing a procession of bottles with caps thereon, cap contracting members movable in unison with said procession of bottles above the same, said cap contracting members comprising a body, an annular series of jaws arranged in the body to receive the top of the bottle with a cap thereon and being movable radially toward and from the axis of the body to contract the cap about the neck of the bottle, an annular heating unit secured to the lower end of the body and operable to heat the marginal portion of the cap during movement of the bottle and the contracting member, an annular folding member depending from said body and arranged within said heater and being operable upon relative axial movement between the bottle and the cap contracting member to fold the heated portion of the cap about the neck of the bottle, and means operable to direct an air blast about said jaws and folding member.

4. A machine for applying hood caps to bottles, the skirt portions of which caps are coated with a substance rendered adhesive by the application of heat to make the caps self-securing on the bottles, comprising a frame, means operable for advancing a procession of bottles with caps thereon, cap contracting members movable in unison with said procession of bottles above the same, said cap contracting members comprising a body, a circular member rotatably mounted in the lower end of the body, a plurality of cap contracting jaws slidably mounted in the body and being movable radially toward and from the axis thereof upon relative rotation between said member and the body, said body being formed with an air duct receiving passage and with an annular passage connecting therewith and arranged above said circular member, said body being formed with a plurality of passages extending from said annular passage outwardly through the body, and said circular member being provided with a plurality of passages extending from said annular passage downwardly to the interior of said member, an annular heating member secured to the lower end of the body and operable to heat the marginal portion of the cap on the bottle positioned below said cap contracting member, an annular folding member depending from the body and arranged within said heater and being operable to fold the heated portion of the cap about the neck of the bottle upon axial movement of the cap contracting members toward the bottle, means operable to create a blast of air and a duct connected with said means and extending into the duct receiving passage in the body of the cap contracting members.

5. A machine for applying hood caps to bottles, the skirt portions of which caps are coated with a substance rendered adhesive by the application of heat to make the caps self-securing on the bottles, comprising a frame, a horizontal turret journalled upon the frame and being provided with a plurality of circumferentially spaced apart bottle supports, an annular series of cap contracting heads arranged above said turret with each of said heads being positioned over a bottle support and said heads being movable in unison with said turret, bottle conveyor means operable to feed uncapped bottles onto said turret and to feed capped bottles off from said turret, each of said heads comprising a body formed with an aperture in the lower end thereof, an annular cap heating member depending from each of said heads and arranged concentrically of said aperture, cap feeding means operable to deposit a cap on the top of each bottle as the same is fed onto the turret, cam means cooperable with said heads to move the same toward the bottles to position said heating member in heat exchanging relation with the cap on the bottle and to subsequently move said heads into engagement with the heated caps to fold the same about the top of the bottle, a blower mounted on the frame having an intake passage and a discharge passage, and a duct leading from said discharge passage to the interior of each of said heads and directing an air blast through the cap engaging portion of each head.

6. A machine for applying hood caps to bottles, the skirt portions of which caps are coated with a substance rendered adhesive by the application of heat to make the caps self-securing on the bottles, comprising a frame, a bottle support for supporting a bottle with a cap thereon, a cap contracting head formed with a bottle top receiving recess in the lower end thereof, an annular heating member depending from said head and being arranged concentrically with said recess, a plunger slidably mounted in said body and being movable into and out of said recess, means operable to effect relative axial movement between said bottle support and said head to effect engagement between said plunger and the cap on the bottle, and to position said heating member in heat exchanging relation to the cap, said means being operable to subsequently effect further axial movement between said support and head to move the top of the bottle and said plunger into said recess, said head being operable upon engagement with the cap to fold the marginal portion thereof about the top of the bottle, said head being formed with an air duct having an outlet passage opening through the top wall of said recess, blower means operable to direct a blast of air through said duct, and said plunger being operable upon movement thereof into said recess to restrict the flow of air through the recess.

7. A machine for applying hood caps to bottles, the skirt portions of which caps are coated with a substance rendered adhesive by the application of heat to make the caps self-securing on the bottles, comprising a frame, a bottle support, a cap contracting head formed with a bottle top receiving recess in the lower end thereof, an annular cap heating member depending from said head and being arranged concentrically with said recess, an annular cap folding member depending from the head and arranged within said heating member, said head being provided with an air duct having an outlet passage opening into said recess, means operable to create a blast of air through said duct and passage, and said cap folding member being formed with an aperture through the side wall thereof, a plunger slidably mounted in the head and movable through said folding member into and out of said recess, means operable to effect relative axial movement between said bottle support and said head to effect engagement between said plunger and a cap on the bottle and to position said heating member in heat exchanging relation to the marginal portion of the cap, and said means being operable to subsequently effect further axial movement between said support and head to move the top of the bottle through said folding member and into said recess, said folding member being operable during such movement to fold the marginal portion of the cap about the top of the bottle, and said plunger being operable upon movement thereof into said folding member to direct the air flow from said bottle top receiving recess through the aperture in said folding member.

8. A machine for applying hood caps to bottles, comprising a frame, a bottle support, a cap contracting head arranged above said bottle support and formed with a bottle top receiving aperture in the lower end thereof, an annular member rotatably mounted in said aperture, an annular series of pins depending from said head, and a second series of pins depending from said annular member, a guide plate arranged at the lower end of said head and annular member and being formed with a plurality of radially extending slots, a cap contracting jaw slidably mounted in each of said slots, a cam member pivotally secured to each of said jaws and being cooperable with said pins upon relative rotation between said head and annular member to effect sliding movement of said jaws toward and from the axis of the head, means operable to effect relative axial movement between said bottle support and said head to position the top of the bottle with a cap thereon in said annular member, and means operable to subsequently effect relative rotation between said head and said annular member.

9. A machine for applying hood caps to bottles, the skirt portions of which caps are coated with a substance rendered adhesive by the application of heat to make the caps self-securing on the bottles, comprising a frame, a turret rotatably mounted upon the frame and operable to carry bottles with caps thereon, a circular head supporting member arranged coaxially above the turret and being rotatable therewith, an annular series of cap contracting heads slidably mounted in said head supporting member toward and from the turret, each of said heads being provided with a cap heating element, cam means carried by the frame and cooperable with said heads to move the same axially toward said turret to position the heating element of each head in heat exchanging relation with a cap on the top of a bottle and to effect further axial movement of said heads into engagement with the caps, and said heads being operable upon such movement to fold the marginal portion of the cap about the top of the bottle and to subsequently move said heads upwardly out of engagement with the bottles, said head supporting member being formed with an annular duct and each of said heads being provided with a conduit extending into said head supporting member and connecting said duct with the interior of the head, and means operable to direct a blast of air through the duct in said head supporting member.

10. A machine for applying hood caps to bottles, the skirt portions of which caps are coated with a substance rendered adhesive by the application of heat to make the caps self-securing on the bottles, comprising a frame, a turret rotatably mounted upon the frame, a circular head supporting member arranged above the turret and being rotatable therewith, an annular series of cap contracting heads slidably mounted in said head supporting member, each of said heads being provided with a cap heating element, cam means carried by the frame and cooperable with said heads to move the same axially toward said turret to position said heating element in heat exchanging relation with a cap on the top of the bottle and to effect further axial movement of said heads into engagement with the caps, and said heads being operable upon such movement to fold the marginal portion of the cap about the top of the bottle, said means being also operable to subsequently move said heads upwardly out of engagement with the bottles, said head supporting member being formed with an annular duct and each of said heads being provided with a conduit extending into said head supporting member and connecting said duct with the interior of the head, a blower mounted on the frame centrally of said head supporting member and operable to direct a blast of air therethrough.

11. A machine for applying hood caps to bottles, the skirt portions of which caps are coated with a substance rendered adhesive by the application of heat to make the caps self-securing on the bottles, comprising a frame, a turret rotatably mounted on the frame, a circular head supporting member arranged above said turret and being rotatable therewith, said head supporting member being mounted upon a vertically extending column arranged centrally of the turret, an annular series of cap contracting heads slidably mounted in said supporting member and being movable toward and from said turret, means operable upon rotation of said turret to feed uncapped bottles thereon and to discharge capped bottles therefrom, each of said heads being provided with an annular heating element depending below the heads, cam means carried by the frame and cooperable with said heads to effect movement of the same toward the turret to position said heating elements in heat exchanging relation with caps on said bottles and to subsequently move said heads into engagement with the heated caps, and said heads being operable upon such engagement to fold the marginal portion of the cap about the top of the bottle, said head supporting member being formed with an annular duct, each of said heads being provided with a conduit, the upper ends of said conduits being slidably arranged in said duct and connecting the same with the interior of the heads, a blower arranged centrally of said head supporting member and having an inlet passage connected with said column and having a discharge passage opening into the duct of said head supporting member, and said blower being operable to create a flow of air through said duct and conduits into said heads.

12. A machine for applying hood caps to bottles, the skirt portions of which caps are coated with a substance rendered adhesive by the application of heat to make the caps self-securing on the bottles comprising a base, a turret rotatably mounted on the base and operable to advance a procession of bottles with caps thereon, an annular series of cap contracting heads arranged above the turret with each of said heads positioned in alinement with a bottle on the turret, said annular series of heads being movable in unison with said turret and each of said heads being provided with a cap heating unit, and cam means operable to successively move the heads downwardly to fold the marginal portion of the cap about the top of the bottle, each of said heads being provided with a plurality of cap engaging members operable to contract the folded portion of the cap against the bottle, a source of air pressure, a channel leading from said source to each head to direct a blast of air through the same for cooling said cap engaging members, and humidifying means operable to maintain said air blast at a predetermined humidity.

13. A machine for applying hood caps to bottles, the skirt portions of which caps are coated with a substance rendered adhesive by the application of heat to make the caps self-securing on the bottles comprising a base, a turret rotatably mounted on the base and operable to advance a procession of bottles with a cap on the top of each bottle, an annular series of cap contracting heads arranged above the turret with each of said heads positioned in alinement with a bottle on the turret, said annular series of heads being movable in unison with said turret and each of said heads being provided with a cap heating unit, and cam means operable to successively move the heads downwardly to fold the marginal portion of the cap about the top of the bottle, each of said heads being provided with a plurality of cap engaging members operable to contract the folded portion of the cap against the bottle, a blower, means connected to the intake of said blower and operable to maintain the air taken in the blower at a predetermined humidity, a duct extending from said blower to each of said heads and operable to direct a blast of air from said blower through said heads to effect cooling of said cap engaging members.

14. A machine for applying hood caps to bottles, the skirt portions of which caps are coated with a substance rendered adhesive by the application of heat to make the caps self-securing on the bottles, comprising a base, a turret rotatably mounted on the base and operable to advance a procession of bottles with a cap on the top of each bottle, a head supporting member arranged above the base, an annular series of cap contracting heads carried by said supporting member with each of said heads positioned in alinement with a bottle on the turret and said supporting member being rotatable in unison with the turret, each of said heads being provided with a cap heating unit, said cap contracting members being positioned with the heater unit of each of said members in heat exchanging relation with the cap on the bottle below said member for a predetermined distance of the advancement of the bottle by the turret to heat the marginal portion of the cap, and cam means operable to successively move the heads downwardly to fold the marginal portion of the heated cap about the top of the bottle, each of said heads being provided with means operable to contract the folded portion of the cap against the bottle, a blower arranged centrally of said head supporting member, a de-humidifying means arranged in the base and being connected to the intake of said blower, a duct connecting the outlet of said blower with each of said heads and being operable to direct a blast of de-humidified air through each head.

15. A machine for applying closures to bottles, which closures are coated with a substance rendered adhesive by the application of heat to make the closures self securing on the bottles, comprising a frame, means for supporting a plurality of bottles, a closure magazine for supporting a plurality of closures, closure transfer mechanism operable to transfer closures from said magazine and deposit the same on the tops of the bottles, a plurality of closure contracting members, one of said members being arranged above each of said bottles, a closure heating member carried by each closure contracting member, means operable to maintain said closure contracting members with the heating members thereof in heat exchanging relation to the closures on the bottles below said members for a predetermined time, and means operable to subsequently effect relative axial movement between the bottles and said closure contracting members to cause said members to contract the marginal portions of the heated caps about the necks of the bottles, and thereafter move said members out of engagement with the capped bottles.

16. A machine for applying hood caps to bottles, which caps are coated with a substance rendered adhesive by the application of heat to make the closures self-securing on the bottles, comprising a bottle support, a cap contracting head arranged above said bottle support, a cap heating member carried by said head and operable to heat a cap positioned on the bottle, a source of air pressure, a channel leading from said source to each head and operable to direct a blast of air through said head to maintain the same at a relatively low temperature during the heating of the cap, humidifying means operable to maintain said air blast at a predetermined humidity, and means operable to effect relative vertical movement between the bottle support and head to fold the marginal portion of the heated cap about the neck of the bottle, and said head being thereafter operable to contract the cap on the bottle top.

17. A machine for applying hood caps to bottles, which caps are coated with a substance rendered adhesive by the application of heat to make the caps self-securing on the bottles, comprising a bottle support, a cap contracting head arranged above said bottle support, a cap heating member carried by said head and operable to heat a cap positioned on the bottle on said support, a source of air pressure, a channel leading from said source to said head and operable to direct a blast of air through the head to maintain the same at a relatively low temperature, means operable to direct said air blast from contact with the cap while the same is being heated, and means operable to effect relative vertical movement between the bottle support and said head to bring the heated cap and the head into engagement, and to fold the marginal portion of the heated cap about the neck of the bottle, and said head being thereafter operable to contract the cap on the bottle top.

EDWARD N. LOWRY.